United States Patent Office 2,886,796
Patented May 12, 1959

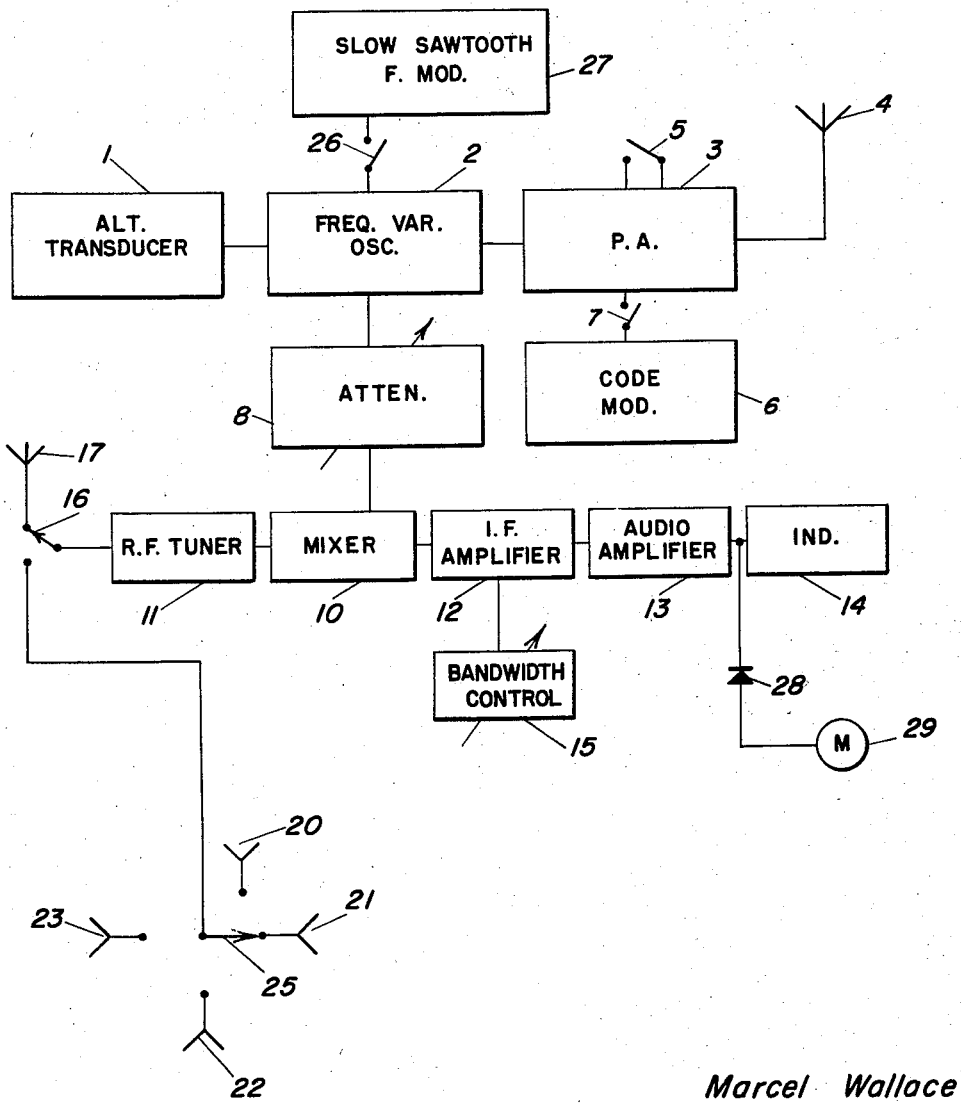

2,886,796
PROXIMITY INDICATOR

Marcel Wallace, Byram, Conn., assignor to Panoramic Radio Products, Inc., Mount Vernon, N.Y., a corporation of New York Application August 22, 1956, Serial No. 605,539

4 Claims. (Cl. 340—27)

The present invention relates generally to proximity indicators for aircraft, and more particularly to systems for indicating the proximity in altitude of one craft to another.

The present system involves a transmission, from each of a plurality of aircraft, of a signal having a frequency determined in accordance with the altitude of the aircraft. Such signals may be intercepted at all proximate aircraft, at each of which is compared its own frequency of transmission with that of all proximate aircraft. To this end the transmission frequency aboard each aircraft is controlled as a function of altitudes of the aircraft, and is also employed as the local oscillator frequency of a superheterodyne type receiver. The I.F. frequency amplifier of the receiver may then have a band width extending from zero to some frequency, representative of a maximum difference of altitude for which interest exists for users of the system. So, the total difference of frequency of which the transmitters of the system are capable may extend from $F0=200$ kc. at sea level, to $F0+Fm=220$ kc. for an altitude of 40,000 feet, and the variation of frequency with altitude $$\frac{df}{da}$$

may be linear over this range, to take a simple non-limiting example. A maximum difference frequency of 20 kc. is employed, which represents 40,000 feet of altitude, so that $$0.50 \text{ c.p.s. per foot} = \frac{df}{da}$$

It may be desired to receive indications of altitude from altitude-proximate craft, provided that the proximity is less than $\pm 1,000$ feet, for example only. This represents a frequency band of 500 c.p.s., and the I.F. amplifier may then be arranged to respond only to frequencies in the band 0–500 c.p.s.

Indicating devices, aural or visual, may be connected to the I.F. amplifier, to provide indications of altitude difference between altitude proximate aircraft. In the simplest case, earphones or a small speaker will suffice to provide indications. In more complex installations resort may be had to spectrum analyzers, of the scanning or non-scanning type, many examples of which are known in the prior art.

In the simplest form of the invention, accordingly, I provide an aircraft proximity indicator, or collision warning system, wherein the ear of the pilot, navigator, or other crew member of an aircraft may serve to detect aural signals of the presence of another aircraft within a predetermined air space above or below his flight level.

In order to provide a further indication, concerning the algebraic sign of the relative altitudes of two aircraft, provision may be made for varying the frequency of the local oscillator in a given direction from that representative of altitude. If aircraft A is above aircraft B, for example, and varies his local oscillator frequency upwardly the difference between the frequencies FA and FB, representative of the altitudes of aircraft A and B, will increase. If, on the other hand A is below B, the absolute value of the difference between frequencies FA and FB will decrease. In accordance with one embodiment of the present invention, provision is made for terminating transmission at any aircraft for a sufficient time to enable a test procedure to be performed, the results of which indicate whether a proximate aircraft is at greater or lesser altitude than the testing aircraft. The test consists in the variation of local oscillator frequency in a predetermined sense, and an examination of the sense of variation of receiver output signal in response to variation of local oscillator frequency. To provide an example, if test is performed at the A craft, by raising the frequency of the A oscillator, the difference frequency will increase if the B oscillator is below the A oscillator, but will decrease if the B oscillator is above the A oscillator. Hence, variation of the frequency of the A oscillator will produce an audible "whine" or change of pitch, the change occurring in a sense determined by the relative altitudes of the two craft.

While stress has been placed hereinabove on use of a linear variation of frequency with altitude, in fact a non-linear variation with altitude may be preferable, on the basis that at low altitudes small changes in altitude are important and air-space at a premium, while at high altitudes air-space is plentiful and considerable altitude separation between craft may be economically maintained. Accordingly, I may utilize a curve of frequency versus altitude which has a slope $$\frac{df}{da}$$

which is low at lower altitudes and high at higher altitudes. If desired the slope may vary logarithmically, or in any event curvilinearly. In the alternative, the curve may have a discontinuous slope, providing, for example, a linear portion such that 800 feet of differential altitude may be indicated for a given receiver pass-band, at altitudes up to 30,000 feet, and 1600 feet at altitudes above 30,000 feet.

The system thus briefly described possesses the prime advantages that a small range of frequencies may be employed to indicate a considerable range of altitude variations, and that operation may occur at low absolute frequencies, preferably in the band 200 kc. to 400 kc., where extreme stability of oscillator performance may be attained readily. The latter property is, of course, essential to the former, and moreover permits simple aural proximity indications, suitable economically for light, inexpensive aircraft. In more extensive installations the receiver antenna may be directional, and provision may be made for obtaining directional information concerning proximate aircraft.

It is also desirable to provide for meter indication of receiver output, and for manual variation of I.F. band-width, to render the system more flexible, and for other purposes hereinafter described.

It is, accordingly, a broad object of the present invention to provide a novel proximity warning system for aircraft, which shall be economical of space and cost, and thereby be suitable for use in small privately owned aircraft.

It is another object of the present invention to provide a system of proximity warning between aircraft, in which each aircraft transmits a frequency representative of its own altitude, and carries a superheterodyne type receiver employing the altitude representative transmitted frequency as a local oscillator frequency, the pass-band of the I.F. amplifier of the receiver being selected to pass only signals representative of less than a predetermined difference of altitudes.

A further object of the invention resides in provision of a system having the previously stated objectives, to which may be added at will (1) devices for determining the direction of proximate aircraft, (2) devices for indicating whether a proximate aircraft is above or below another aircraft, (3) in which the proximity signal is audible or below audible, and the sense of relative altitude of two aircraft is aurally indicated, (4) in which the upper frequency of the pass-band of the I.F. amplifier may be varied at will.

The above and still further objects, features and advantages of the present invention will become apparent upon consideration of the following detailed description of one specific embodiment thereof, especially when taken in conjunction with the accompanying drawings, wherein the single figure of the drawings is a functional block diagram of a system according to the present invention.

Referring now more specifically to the accompanying drawings, the reference numeral 1 denotes an altitude transducer, which serves to control the frequency of oscillation of sinusoidal oscillator 2, in accordance with altitude of an aircraft within which the transducer is mounted. A 20 to 40 kc. band in the range 200–400 kc. is preferred. The output of oscillator is amplified by a power amplifier 3 and transmitted omni-directionally from antenna 4, at a power adequate for reception over approximately a circle of five mile radius. Accordingly, transmissions from antenna 4 represent, in terms of frequency, altitude of the transmitting aircraft.

A switch 5 is provided for power amplifier 3, which serves to turn the latter on and off at will, manually or automatically. A code modulator 6 is provided, which may be connected to power amplifier 3 at will by means of a switch 7, manually at will or automatically at intervals, and which causes the transmissions to be modulated by an on-off code representative of identity of the aircraft and/or other desired information, such as destination, flight number, or the like.

The output of oscillator 2 is applied via an attenuator 8 to a mixer 9 of a superheterodyne type radio receiver, REC., providing local oscillator frequency for the latter. The receiver includes an R.F. tuner or pre-amplifier 11, preceding mixer 10, and an I.F. amplifier 12, an audio amplifier 13 and an indicator 14, following the mixer 10 in cascade. The indicator 14 may be constituted for ear-phones or a speaker, for simplicity but for the latter may be substituted a discriminator-limiter and a meter calibrated in terms of aircraft separation in feet, a panoramic spectrum analyzer, a counter, or another desired or known device for indicating frequencies visually. Clearly, ear-phones or a speaker may supplement the latter.

Coupled with the I.F. filter 12 is a band-width control device, 15.

The input to R.F. tuner 11 may derive, via selective switch 16, from an omni-directional antenna 17, or from a directive array of antennas 18. The latter may include four directive antennas, 20, 21, 22, 23 each covering a 90° quadrant, one pointing ahead, one behind, and the remaining two antennas abeam of the craft on opposite sides thereof. The antennas 20, 21, 22, 23 may be selected at will by four-position selector switch 25. In more complex installations I may use an RDF. system which should provide a continuous bearing to the signal beating with the local signal.

To the oscillator 2 may be applied at will, via switch 26, a slow sawtooth frequency variation, deriving from a frequency modulator 27. A total variation of perhaps 60 to 100 c.p.s., at a 1 c.p.s. period may be employed. For simplicity, however, I may use in 27 a simple push-button reactor (condenser) which upon being pressed will cause a slight change in the frequency output of the oscillator 2.

The response band of I.F. amplifier 12 may extend from 0 c.p.s. to some value, determined in accordance with desired characteristics of the system. If, for example, the system is desired to be operative to 40,000 feet altitude, and to employ a total band-width of 40 kc., and if it is desired to warn of the proximity of aircraft with an altitude range up to ±800 feet, with respect to flight level, a band of $$\frac{40,000}{40,000} \times 800 = 800 \text{ c.p.s.}$$

is required. This calculation proceeds on the basis that $$\frac{df}{da}$$

is linear, and that the same altitude range is of interest for all flight levels. Clearly, if the value of $$\frac{df}{da}$$

is non-linear, and is high at low altitude and low at high altitudes, a range of 800 c.p.s. will not equal ±800 feet, at all altitudes. Rather a relatively small change in altitude will represent the specified frequency change at low altitudes, and a much larger change in altitude will represent that change in frequency at high altitudes. The system is made more flexible by providing manual band-width control 15, which may be calibrated in terms of desired altitude range from zero to 2,000 feet for which a proximity warning will be obtainable. A rectifier 28 and D.C. meter 29 may supplement the indicator 14.

In operation, each aircraft normally transmits altitude information continuously. At will, when in the vicinity of other craft, or for other reasons, the switch 7 may be closed, so that information may be transmitted concerning craft's identity, or the like. The transmitted frequency is supplied as local oscillator signal to receiver 15, which then provides an output indication whenever another craft, equipped in accordance with the invention, is flying in proximity to the first craft and at sufficiently near the same frequency that the difference of transmitted frequencies from the two craft falls within the pass band of the I.F. filter 12.

Devoting the frequency transmitted by the first craft as FA, that transmitted by the second craft as FB, and the pass band of filter 12 as $f$, so long as $|FB-FA|$ is greater than $f$ no indication will be provided, since no signal will pass through the filter 12. When $|FA-FB|$ becomes less than $f$ a signal will normally be heard, at indicator 14, if the latter is a speaker, and the pointer of meter 27 will deflect. The extent of deflection will provide a rough indication of range between the craft, and the frequency of the tone will provide an indication of altitude proximity. The tone provided by indicator 14 does not indicate when FB is above or below FA, but only $|FB-FA|$. To determine whether FB is greater than or less than FA switch 5 may be actuated to disable power amplifier 3, and switch 26 is closed. Transmission may be thus terminated without disabling receiver 10, if desired, and oscillator 2 is caused to change in frequency over a small range, say 60 to 100 c.p.s., either in the direction of increasing or of decreasing frequency according to a convention previously adopted. This effects progressive variations of $|FB-FA|$, which may each require a second or two, and the sense of the variation will be increasing or decreasing, according as $FB>FA$ or $FB<FA$.

Reliance on aural recognition of tone frequency is not essential, in the present system, since, if desired, the bandwidth of filter 15 may be cut back until the meter 29 ceases to read, or until any given tone is lost. The control knob of bandwidth control 15 may be calibrated to read in c.p.s., so that an accurate reading of frequency differences becomes feasible. Moreover, where a number of warning tones occur simultaneously these may be cut out one by one, to determine altitude separations, and confusion which might otherwise exist is avoided.

Actuation of selective switch 25 enables a determination of quadrantal directivity of any proximate craft.

The meter 29 is particularly useful in indicating the presence of sub-audible beats. When such are indicated closure of switch 26 will cause sufficient frequency variation to bring out an audible tone, audible as a sweeping frequency.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. In combination, devices aboard each of a plurality of aircraft, said devices each including means for transmitting an altitude signal having a frequency representative of instantaneous altitude of the transmitting aircraft, said devices each including a superheterodyne type receiver for receiving altitude signals from the remainder of said plurality of aircraft, each receiver aboard a given aircraft including a source of local oscillations having the frequency of the altitude signals for that aircraft, each receiver including a low pass intermediate frequency amplifier having a response range extending from 0 c.p.s. to $f$ c.p.s. where $f$ is an audio frequency, each of said devices having means for varying the frequency of said local oscillations in a predetermined sense, and means for observing the sense of variation of signals passed by said low pass intermediate frequency filter during variation of the frequency of said local oscillations.

2. In a system for receiving wave energy signals, a receiver having a mixer, a local oscillator for generating local oscillations, means for applying said local oscillations to said mixer, means for applying said signals to said mixer, a filter connected to said mixer and arranged to pass conversion products of said signals and of said local oscillations, said filter having a pass band between substantially zero and $f$ c.p.s., and means for indicating whether said signals or said local oscillations are the higher in frequency, comprising means for varying the frequency of said local oscillations in a predetermined sense and means for detecting the sense of variation of the frequency of said conversion products in response to variation of said local oscillations in said predetermined sense.

3. In a system for receiving wave energy signals, a receiver having a mixer, a local oscillator for generating local oscillations, means for applying said local oscillations to said mixer, means for applying said signals to said mixer, a filter connected to said mixer and arranged to pass conversion products of said signals and of said local oscillations, and means for indicating whether said sigals or said local oscillations are the higher in frequency, comprising means for varying the frequency of said local oscillations in a predetermined sense and means for detecting the sense of variation of the frequency of said conversion products in response to variation of said local oscillations in said predetermined sense.

4. In combination, devices aboard each of a plurality of aircraft, said devices each including means for transmitting an altitude signal having a frequency representative of instantaneous altitude of the transmitting aircraft, said devices each including a superheterodyne type receiver for receiving altitude signals from the remainder of said plurality of aircraft, each receiver aboard a given aircraft including a source of local oscillations having the frequency of the altitude signals for that aircraft, each receiver including an intermediate frequency amplifier having a predetermined response range, each of said devices having means for varying the frequency of said local oscillations in a predetermined sense, and means for observing the sense of variation of signals passed by said intermediate frequency filter during variation of the frequency of said local oscillations.

References Cited in the file of this patent

UNITED STATES PATENTS

| | | |
|---|---|---|
| 2,157,122 | Dunmore | May 9, 1939 |
| 2,378,604 | Wallace | June 19, 1945 |
| 2,403,603 | Korn | July 9, 1946 |
| 2,498,933 | Wallace | Feb. 28, 1950 |
| 2,505,314 | Wallace et al. | Apr. 25, 1950 |
| 2,568,568 | Stansbury | Sept. 18, 1951 |
| 2,580,462 | Ranger | Jan. 1, 1952 |
| 2,585,605 | Wallace | Feb. 12, 1952 |
| 2,618,747 | Luck | Nov. 18, 1952 |